United States Patent [19]
White

[11] 3,780,451
[45] Dec. 25, 1973

[54] STUDY DEVICE
[76] Inventor: William T. White, 5110 W. School St., Chicago, Ill. 60641
[22] Filed: Aug. 24, 1972
[21] Appl. No.: 283,328

[52] U.S. Cl. ............................................. 35/9 E
[51] Int. Cl. ............................................. G09b 3/00
[58] Field of Search ............ 35/9 E, 9 F, 9 R, 35/8 R, 31 E, 31 C, 35 D, 35 E, 35 R, 75, 77

[56] References Cited
UNITED STATES PATENTS
| | | | |
|---|---|---|---|
| 3,579,854 | 5/1971 | Tusson | 35/8 R |
| 2,385,452 | 9/1945 | Lande | 35/35 E |
| 3,364,596 | 1/1968 | Correa | 35/9 R |
| 3,365,820 | 1/1968 | Connell | 35/77 |

Primary Examiner—Wm. H. Grieb
Attorney—Benjamin H. Sherman et al.

[57] ABSTRACT

A query and response study device having a frame member covered by a flexible sheet extending around the frame member with open ends, the sheet being slidable on the frame member, and the sheet having two spaced-apart transverse slots therethrough open to the interior of the frame, the frame accommodating cards having printed indicia thereon in lines. The flexible sheet can slide on the frame to align the slots with a given line on one of the cards held internally of the frame whereby the indicia on that line represents a query. The frame can then be turned over where the other slot will be found to be aligned with a line of printed indicia on the opposite side of the same card or on a different card, that line representing a response to the query.

8 Claims, 6 Drawing Figures

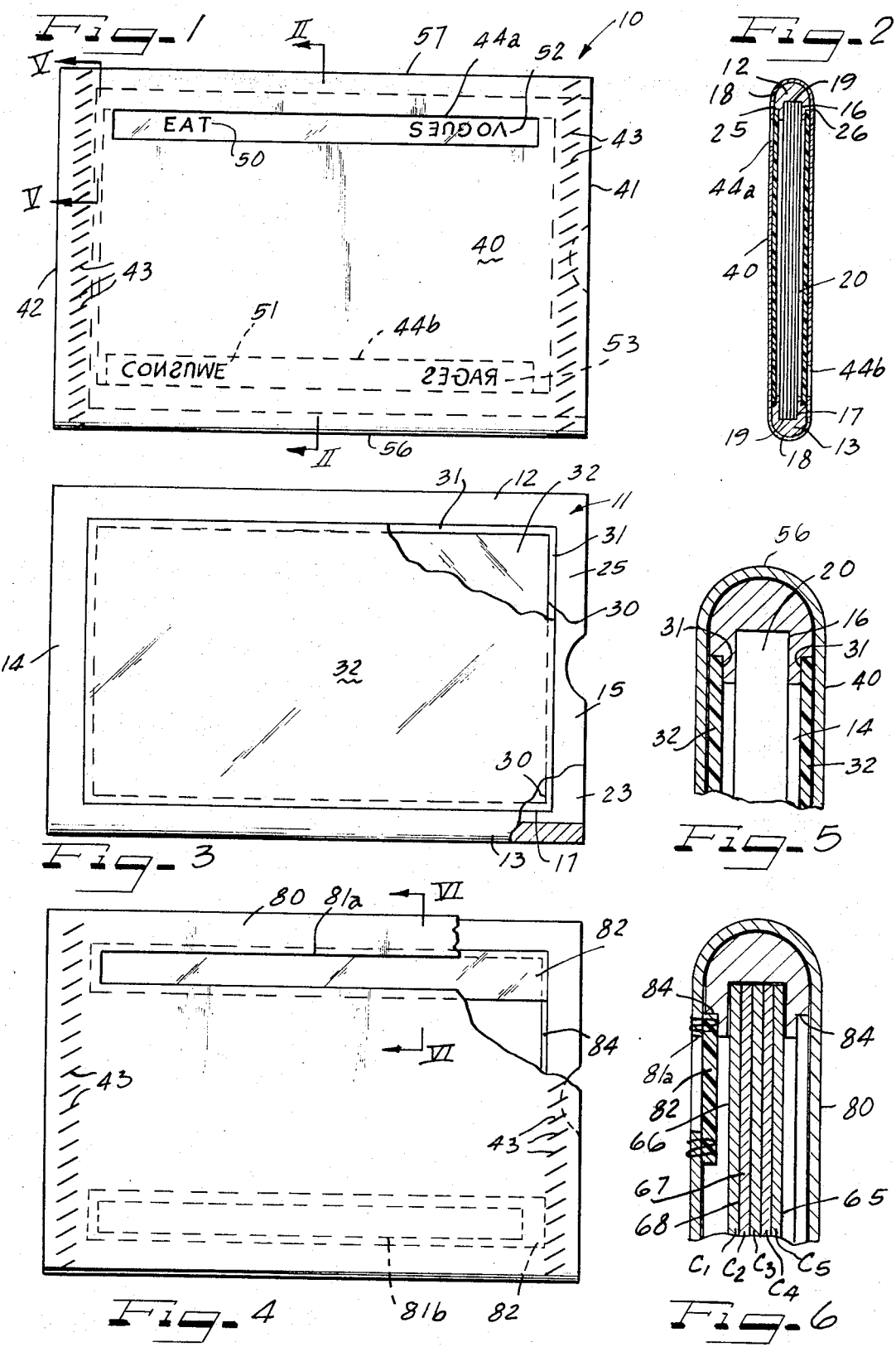

3,780,451

STUDY DEVICE

BACKGROUND OF THE INVENTION

1. Field of the Invention

This invention relates to a mechanical study device and more particularly to a viewing and holding device for cards having printed indicia thereon.

2. Prior Art

Numerous devices have been created which incorporate printed indicia giving both inquiry and response statements.

These devices have found use in diverse fields such as languages, where the inquiry would be a foreign language word or sentence and the response would indicate the translation to the native language; in mathematics where the inquiry would be a problem and the response the answer and in other fields of education and recreation.

Most such devices have relied upon either separate pages in a book, such as is common in language and translation devices, or have used techniques such as flash cards where the answer might be printed on the reverse side of the question.

Where a book type of system is used, a great deal of inconvenience occurs in turning from one page to another for quick reference. Techniques such as flash cards, on the other hand, while giving the user ready access to the answer, are not truly versatile and are bulky to carry and use when a large number of problems are fitted together in a single lesson or kit.

It would therefore be an advance in the art to provide an inquiry and response system having ready access to the response from the inquiry, versatility of use and economy of design and space.

SUMMARY

My invention provides an inquiry and response system meeting all of the above criteria.

My system makes use of printed cards which have inquiries on one side and responses on the other. Multiple card sets can be provided where one card will carry responses to inquiries on another card for use as hereinafter described.

The important part of my invention is the holding device in which the cards are positioned and used. The device consists of a frame which may be constructed of plastic or the like, and which holds the cards with their printed indicia viewable from the front and back of the frame. The frame is covered by a flexible material which is wrapped around the frame, covering the top and bottom and open at the ends. This flexible material covering is slidable on the frame longitudinally thereof. The flexible material has two transverse slots therethrough spaced from one another such that when one slot is on the front side of the frame, the other slot is on the back side. Thus, sliding the frame so that the slot on the front side moves for example from the upper to the lower portion of the front side will cause the slot on the back side to move from the lower to the upper portion. As the slot is moved, it aligns with successive lines of printed indicia on the cards held within the frame. The cards are printed such that when one slot overlies an inquiry line, the opposed slot will overlie the response line corresponding with the exposed inquiry line. By printing the response and inquiry upside down with respect to one another, the response will be read merely by inverting the frame from top to bottom.

In the preferred embodiments illustrated, the frame has a secondary transparent member interposed between the slot and the cards. In one embodiment, the transparent member comprises a pane of glass or plastic or the like which is attached to the frame and received in a recess behind the flexible material covering.

In another embodiment, the transparent pane consists of two panes attached to the undersurface of the flexible material and carried with it when the flexible material is moved on the frame.

It is therefore an object of this invention to provide a convenient versatile inquiry and response system.

It is another and more specific object of this invention to provide an inquiry-response viewing system with a device holding a plurality of sheets having printed indicia thereon, the device selectively giving access to only a portion of the printed indicia representing an inquiry and a mating response.

It is a further object of this invention to provide an inquiry-response system including a frame having top and bottom sides, the frame receiving sheets having printed indicia thereon, the indicia corresponding to inquiries and responses, the frame being covered by a flexible material slidable on the frame, the material having viewing slots therethrough, the viewing slots being alignable with an inquiry on the front or back of the device and another slot being automatically aligned with the corresponding response on the opposite side.

BRIEF DESCRIPTION OF THE DRAWINGS

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure, and in which:

FIG. 1 is a front plan view of the device of this invention;

FIG. 2 is a cross-sectional view taken along the lines II-II of FIG. 1;

FIG. 3 is a top plan view of the frame of this device equipped with a transparent plate;

FIG. 4 is a front plan view of an alternative embodiment of the device of this invention with portions of the flexible cover broken away to show underlying portions;

FIG. 5 is a cross-sectional view taken along the lines V—V of FIG. 1; and

FIG. 6 is a cross-sectional view taken along the lines VI—VI of FIG. 4.

DESCRIPTION OF THE PREFERRED EMBODIMENTS

FIGS. 1, 2, 3 and 5 illustrate a preferred embodiment of the device 10 of this invention.

The device consists of a frame 11 having top 12 and bottom 13 support members and side support members 14 and 15 with the side support member 14 being definable as a back end support and the side support 15 being definable as a front end support. The frame defines a rectangular opening therethrough.

As illustrated in FIG. 2, the frame members 12 and 13 have opposed channels 16 and 17 therein and curved outside surfaces 18. The channels 17 are spaced from one another from their bottom walls 19 a distance approximately equal to the height of a printed card 20 to be received in the channels between the top 12 and bottom 13 support. Thus, if a standard 3 by 5 -inch sized index card were to be received in the channel, the channels would be spaced approximately 3 inches apart from their back walls 19.

The back end support 14 may also have a channel 20 therein communicating at either end with the channels 16 and 17. In this manner, a three-sided channel is provided. The front end support 15 has a slot 23 therethrough open to the channels 16 and 17 providing access to the three-sided channel 16,17,20 whereby cards may be slipped into the interior of the frame through the slot 23 in the front end support 15.

The frame 11 is hollow from the top 25 to the bottom 26 defining an open space 30 which is defined by the top and bottom support members and back end and front end support members which may be attached together integrally and formed as one piece of plastic or the like material.

The opening 30 defined by the frame may be surrounded by a recess or ledge 31 in the frame members. The recess or ledge 31 receives a plate of transparent material 32 such as glass or transparent plastic or the like dimensioned to be received within the ledge 31 closing the opening 30 on both the front 25 and back 26 of the frame.

It will be appreciated that although the ledge 31 has been described as extending entirely around the frame, that in certain instances the ledge may be provided only on the top support member 12 and bottom support member 13 or alternatively only on the back end support 14 and front end support 15.

The frame, with the transparent sheet 32 inserted therein and attached thereto, is covered by an endless belt or loop of flexible material 40. The belt of material 40 has open ends 41 and 42 at the outside faces of the front end 15 and back end 14 supports. The flexible material belt 40 is slidable on the frame around the frame from top to bottom. In order to aid in sliding, irregularities, such as stitches or the like 43, may be provided in the areas of the flexible material belt overlying the front and back end supports 14 and 15. Therefore, by grasping the frame in the hands with the hands positioned overlying the front and back end supports, an opposed movement of the thumb and fingers will cause the belt to slip on the frame.

The belt has two transverse slots 44a and 44b spaced from one another on opposed portions of the belt when the belt is received on the frame. As illustrated in FIG. 2, when the slot 44a is at the top of the front side of the device, the slot 44b will be at the bottom of the back side. The slots 44a and 44b extend substantially across the width of the opening 30 and give view to the interior of the device. The flexible material 40 is constructed of an opaque material so that the cards received in the interior of the frame can be read only through the slots.

OPERATION OF THE DEVICE

The study device of my invention is designed to be used as follows. A card is provided with printed indicia on the front and back thereof. The indicia on the two sides is presented in lines across the width of the card with the indicia on the back side printed upside down and reverse of the indicia on the front side. The lines are dimensioned approximately with respect to the height of the slots 44a and b. Therefore, when the slot 44a overlies a line on a card inserted into the grooves 16, 17, 20 through the slot 23, that line will be viewable through the slot 44a. If the line viewable through the slot 44a represents a query or inquiry, then the answer or response to that will be found by inverting the device top to bottom and reading the line exposed through the slot 44b. Due to the reverse printing on the front and back of the card, the printing will be correct for reading only by flipping the device top to bottom. Because the slots 44a, 44b are on opposed portions of the flexible material, the query presented on the top side of the front of the card will have its corresponding answer printed on the bottom side of the back of the card. This is illustrated in FIG. 1 where the slot 44a exposes printed indicia corresponding with the word "eat" 50. If it is assumed that the card inserted is one designed to provide a crossword puzzle dictionary, then the response to the word "eat" is indicated at 51 and would be on the back of the card inserted into the frame and presented in reverse printing. The word indicated at 51 is the word "consume."

In order to increase the flexibility of the device, another set of inquiry and response words printed the reverse of the set 50,51 is indicated at 52,53, spaced across the width of the card from the indicia 50,51.

As the flexible material is moved on the frame, the slot 44a illustrated in FIG. 1 will be moved downwardly towards the bottom 56 of the frame, whereas the corresponding slot 44b will be moved towards the top 57 of the frame on the back side. Thus, successive lines on both sides are exposed through the slots.

As illustrated in FIGS. 2 and 6, the device can be dimensioned to receive a plurality of cards. In such an instance, the response indicia on the back of one card will correspond to the query indicia on the front of another card. For example, as illustrated in FIG. 6, five cards, C1 through C5, are provided. In such an instance, the indicia printed on the back side 65 of the card C5 will correspond to the indicia printed on the front side 66 of Card C1. The indicia printed on the back side 67 of card C1 will correspond to the indicia printed on the front side 68 of card C2. This is continued throughout the five cards. Thus, for example, the card C1 can be withdrawn from its position illustrated and placed behind the card C5. This will give access through the front of the device to the front of card C2, while giving response through the back of the device to the responses on the back side of card C1.

By providing the responses on the back of the device, the device aids in studying inasmuch as answers to problems presented on the front of the device are blocked from view from the front. In order to determine the answer, it is necessary to invert the device. Thus, the device can be used as an aid to learning and memorization. Because the device is designed to use cards of a given size, the device and the cards can be co-dimensioned to provide, for example, a pocket-sized study device which, because of the ability to use a plurality of cards with a plurality of query and responses on each card viewable only one at a time by reason of the slots 44a, 44b, can provide a great deal of information and versatility in a small-sized device.

FIGS. 4 and 6 illustrate a modified form of the invention. In that embodiment, the flexible material cover 80 has opposed slots 81a and 81b therethrough. Two transparent panes 82 are provided which are dimensioned slightly larger than the slots 81a and 81b and which are fixed to the underside of the flexible material 80. Thus, the transparent panes 82 move with the flexible material as it is slid around the frame. Ledges 84 correspond to the ledge 31 of the previous embodiment. The ledge 84 functions as a guide for the panes 82 which are dimensioned to be received across the width of the device in the ledges. The provision of the ledges 84 cooperates with the attachment of the panes 82 to the material to prevent the material from being slid off the ends of the frame and further act to present a limiting factor to the top to bottom movement of the material 80.

It can therefore be seen from the above that my invention provides a unique, versatile, and economical study device capable of presenting a series of matched inquiry-response indicia to a user in a novel form.

Although the teachings of my invention have herein been discussed with reference to specific theories and embodiments and although illustrative means for accomplishing explained results have been described, it is to be understood that these are by way of illustration only and that others may wish to utilize my invention in different designs or applications.

I claim as my invention:

1. A query and response device comprising a flat frame having a hollow interior space open at one end and visible from the front and back sides thereof, said hollow interior being sized and shaped to receive in slidable relation therein a stack of cards inserted through the open end thereof, an endless flexible belt trained around said frame covering the front and back of the frame, said belt having windows in the runs thereof overlying the front and back of the frame, said windows being positioned at opposite ends of the respective runs so that when the belt is rotated around the frame, the windows will traverse the front and back sides of the frame in opposite directions, and a set of superimposed cards forming a stack sized to snugly fit the interior of the frame when inserted through the open end of the frame, said cards having query indicia on one face thereof and answer indicia on the opposite face thereof and arranged in sets in said stack so that the top card of the stack will have query indicia exposed in sequence by the window progressing along one run of the belt while the bottom card of the stack will have answer indicia sequentially exposed by the window in the other run of the belt, and the top card in said stack being removable separately through the open end of the frame to expose the next underlying card and being insertable through the end of the frame to cover the bottom card of the stack to provide answers to the query indicia on the newly exposed top card.

2. The device of claim 1 including transparent windows secured in the front and back of the frame providing supports for the opposite runs of the belt and isolating the belt from the interior space of the frame.

3. The device of claim 1 wherein the frame is rectangular, has grooves in the top and bottom sides thereof receiving the marginal top and bottom sides of the stack of cards and has rounded top and bottom surfaces for smoothly guiding the belt around the frame.

4. The device of claim 1 wherein the indicia on one face of each card in the stack is printed in inverted relation to the indicia on the opposite face of the card so that an upright reading through the windows in both runs of the belt is available by rotating the frame around one side thereof.

5. A study device comprising a flat rectangular frame defining a pocket open at one end, transparent windowpanes on the top and bottom faces of the frame exposing the pocket to view, a stack of cards removably inserted through the open end of the pocket and fitting in snug relationship in said frame, each of said cards having lines of indicia on both faces thereof, the cards and lines of indicia thereon in said stack being so related that the lines of indicia on the top card of the stack will be exposed to one windowpane and co-related lines of indicia on the bottom card of the stack will be exposed to the other windowpane, said frame having smooth, rounded top and bottom surfaces, an endless opaque belt trained around said frame over said top and bottom surfaces and covering said windowpanes, a first window slot in said belt exposing to view a line of indicia on the top card of said stack in the frame, a second window slot in said belt exposing to view a line of indicia on the bottom card of said stack in the frame, and said window slots being so positioned in the belt over the respective windowpanes that rotation of the belt will selectively and simultaneously expose to view a line of indicia at the top face of the device and a line of co-related indicia at the bottom face of the device.

6. The device of claim 5 wherein the top and bottom faces of the frame have peripheral recesses and the transparent windowpanes have their marginal edges seated in said recesses.

7. The device of claim 5 wherein the frame has a three-sided internal channel receiving three marginal sides of the stack of cards in snug sliding engagement.

8. A study device which comprises a flat, rectangular frame having an interior chamber open at one end, a stack of question and answer cards snugly seated in said chamber and removable through the open end of the frame, said frame having open front and back faces exposing the faces of the top and bottom cards of the stack in the frame, said frame having ledges at the ends of the open front and back faces of the frame, an endless opaque belt trained around said frame having runs covering said open front and back faces thereof and slots in said runs, windowpanes underlying said slots carried by said belts and riding in said ledges, and said slots being positioned so that when the belt is rotated on the frame, a question on the top card of the stack in the frame will be exposed to one slot while the answer to said question on the bottom card of the stack will be exposed to the other slot.

* * * * *